United States Patent
Hayward et al.

(10) Patent No.: US 6,279,043 B1
(45) Date of Patent: Aug. 21, 2001

(54) METHOD AND SYSTEM FOR SCRIPT ACCESS TO API FUNCTIONALITY

(75) Inventors: David Hayward, San Francisco; John Kennedy Calhoun, Sunnyvale; Steve Swen, Cupertino, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/070,995

(22) Filed: May 1, 1998

(51) Int. Cl.[7] .................................................. G06F 9/54
(52) U.S. Cl. .................................................. 709/328
(58) Field of Search .................................. 709/310–332; 382/167; 707/101

(56) References Cited

U.S. PATENT DOCUMENTS

| | | | | |
|---|---|---|---|---|
| 6,003,093 | * | 12/1999 | Kester ................... | 709/321 |
| 6,006,231 | * | 12/1999 | Popa ..................... | 707/101 |
| 6,006,279 | * | 12/1999 | Hayes ................... | 709/328 |
| 6,044,173 | * | 3/2000 | Kumada ................ | 382/167 |

OTHER PUBLICATIONS

Sugihara, Michael, "Consistent Color," BYTE, pp(6), Jan. 1995.*

* cited by examiner

*Primary Examiner*—John Courtenay, III
(74) *Attorney, Agent, or Firm*—Sawyer Law Group LLP

(57) ABSTRACT

Aspects for utilizing functionality of an application program interface (API) of a computer system through script access to the API are described. A method aspect includes receiving a script of one or more desired events for manipulating a file, the file having a format, identifying whether a compatible format for the file is known by the API and executing the script on the file by the API when a compatible format is known.

13 Claims, 3 Drawing Sheets

METHOD AND SYSTEM FOR SCRIPT ACCESS TO API FUNCTIONALITY

FIELD OF THE INVENTION

The present invention relates to operations of an application program interface (API), and more particularly to achieving script access for end-users to the operations.

BACKGROUND OF THE INVENTION

Current computer systems provide individuals with opportunities to produce documents of professional quality, such as with desktop publishing software and graphics software programs. Input/Output (I/O) devices that support image input or output for production of such documents typically include, for example, monitors, printers, scanners, and digital cameras. Usually, a profile of each such I/O device known to the computer system is stored in the system, e.g., in a system folder, to identify particular characteristics of each device. By way of example, profiles typically include color matching information.

Color matching information is data, such as red, green, and blue (RGB) values and CMYK (cyan, magenta, yellow, black) values, that are associated with objects and text in the document to control how the objects and text will appear when they are displayed and printed. Because RGB and CMYK values may differ depending on the particular device involved, color matching is offered as a standard component of some operating systems, such as through a ColorSync™ component of MacOS from Apple Computer, for example.

Utilization of the profiles normally occurs through the ColorSync™ component. ColorSync™ refers to a system level API (application program interface) that application programs and device drivers of a computer system call. A device profile typically provides a set of characteristics, such as RGB or CMYK values in the document, to describe the device to which the values are associated and enable the document to be portable, i.e., so that it will have the same appearance when drawn by different devices. Functionality provided for operations by an API component, such as ColorSync™, is only as useful as the implementation ability of the application program that calls it. An inherent limitation exists if an application program does not support the API. Plug-ins for the application program are then often provided to allow the utilization of the API functionality in the program. Subsequent versions of such programs are usually updated to include the necessary support.

Unfortunately, relying on an application program to utilize the API functionalities limits the situations in which these functionalities may be employed. Accordingly, a need exists for an efficient manner of utilizing API functionality by an end-user. The present invention addresses such a need.

SUMMARY OF THE INVENTION

The present invention provides aspects for utilizing functionality of an application program interface (API) of a computer system through script access to the API. A method aspect includes receiving a script of one or more desired events for manipulating a file having a format, identifying whether a compatible format for the file is known by the API, and executing the script on the file by the API when a compatible format is known.

With the present invention, automation of repetitive tasks commonly associated with color management is readily achieved by end-users. Further, the functionality of a color management API that provides desirable color management facilities is accessible via scripting, thus allowing broader utilization of these facilities outside of application programs. In addition, these facilities operate in the background and require no user interface. These and other advantages of the aspects of the present invention will be more fully understood in conjunction with the following detailed description and accompanying drawings.

DESCRIPTION OF THE INVENTION

The present invention relates to achieving script access to a system API. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
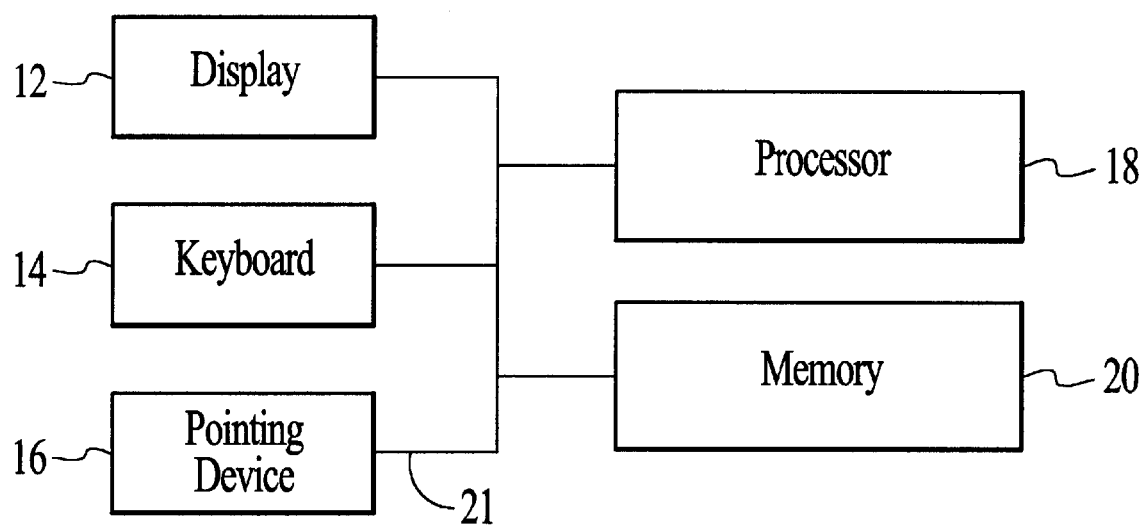
FIG. 1 is a block diagram illustrating a computer system in accordance with the present invention.

FIG. 1 is a block diagram illustrating a computer system 10, e.g., a Macintosh computer available from Apple Computer, Cupertino, Calif., which includes a display 12, a keyboard 14, a pointing device 16, a processor 18, and a memory 20, which are all connected by a bus 21. The processor 18 operates in accordance with an operating system in conjunction with the memory 20 to execute operations, such as those provided by an application program that enables a user to create and manipulate graphics and text, as is well understood by those skilled in the art. In a preferred embodiment, the operating system includes a component, e.g., ColorSync™ 2.5, that achieves a system level API for image manipulation with enhanced features over prior versions of such an API.

It should be appreciated that although the following is described with reference to ColorSync™ 2.5, any system level API that is suitably utilized to achieve similar functionality in a computer system is also included in the present description. Thus, the following is meant to be illustrative and not restrictive of the present invention. Therefore, for purposes of this disclosure, ColorSync™ 2.5 is suitably referred to herein as a color management API.

Further, the ability to provide script access to a system level API is described herein with reference to a color management API and image files. Of course, this is meant as illustrative of a preferred implementation and application of the present invention. Other processing situations may also readily employ the principles described herein.

The functionality provided via the API is normally accessed and utilized by an application program or device driver by makings a call to the API. As is commonly understood, APIs ease programming operations by providing a set of routines, protocols, and tools for particular functionality. In an exemplary embodiment, utilities and image operations of a color management API are no longer restricted for use through an application program aware of the color management API. Rather, end-users capably utilize the color management API through a scripting mechanism of the computer system, e.g., AppleScript[7] in a Macintosh computer, or Visual BASIC in a Windows-based personal computer.

In a preferred embodiment, common utilities and operations of the API may be scripted. By way of example, with a color management API, a common utility includes setting a system profile, while common image operations include the matching of images, e.g., matching one profile to another, which may involve changing color spaces, embedding profiles in images, and soft-proofing of images, e.g., to preview a printed output of an image.

Figure 2:
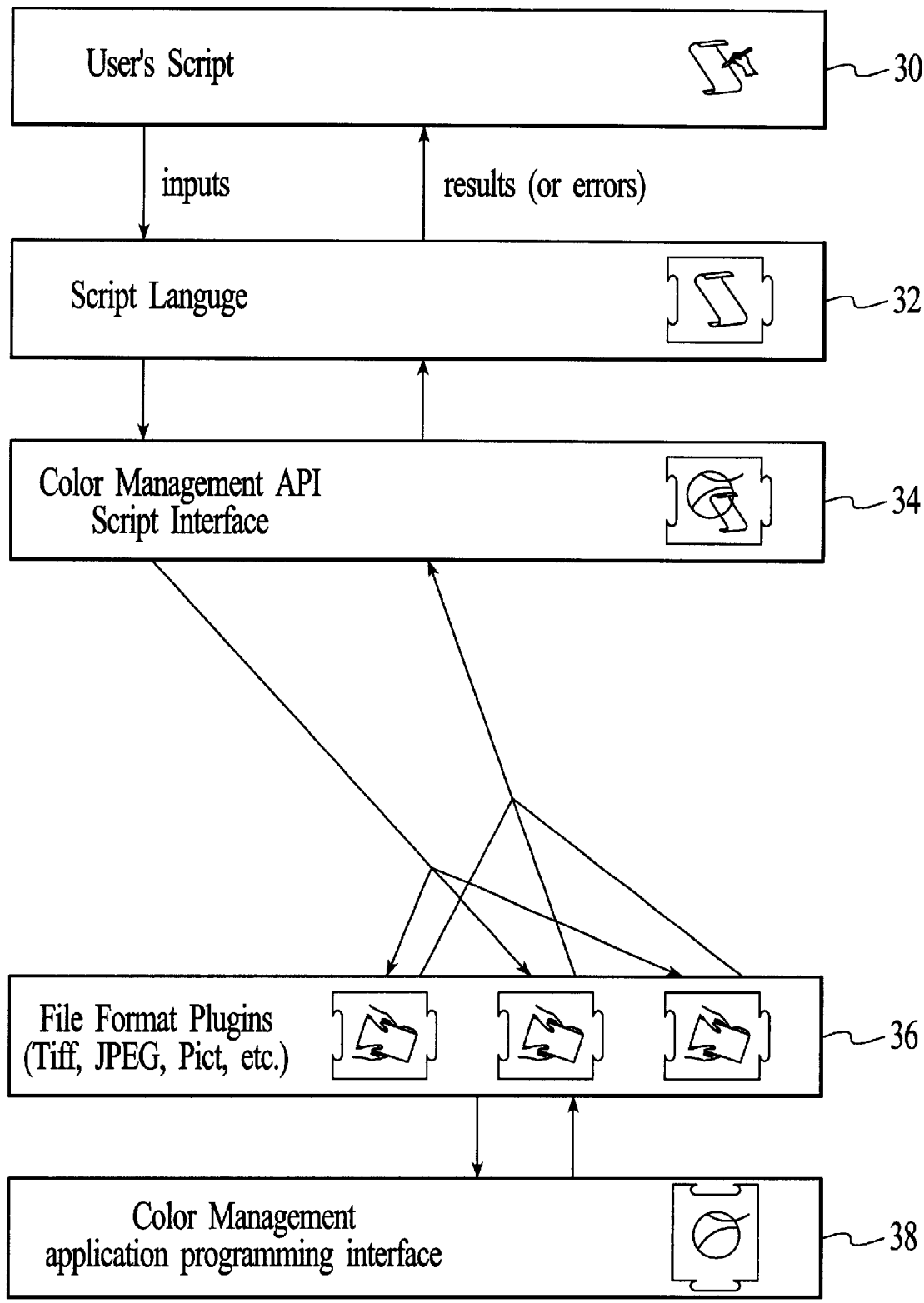
FIG. 2 illustrates an architecture block diagram representation for utilizing an API via a scripting language.

FIG. 2 illustrates an architecture block diagram representation for utilizing an API via a scripting language for the exemplary embodiment of a color management API. Suitably, a user determines the desired script (block 30) and inputs instructions for the scripting language (block 32). For example, the user selects a color matching operation for an image file of a particular file format. The inputs are then suitably transferred to a script interface of the color management API (block 34). The script interface preferably identifies an appropriate file format plug-in for the image file (block 36). By way of example, file formats include TIFF, JPEG, PICT, JFIF, PNG, etc. Through the use of file format plug-ins, expansion for other file formats is readily achievable. The color management API then performs the image operations as scripted (block 38). Once completed, the flow of data returns, from the color management API (block 38), with the results of the operations suitably converted to the appropriate file format (block 36), transferred to the script interface of the color management API (block 34), which provides the data to the scripting language (block 32) for return to the user (block 30).

Figure 3:
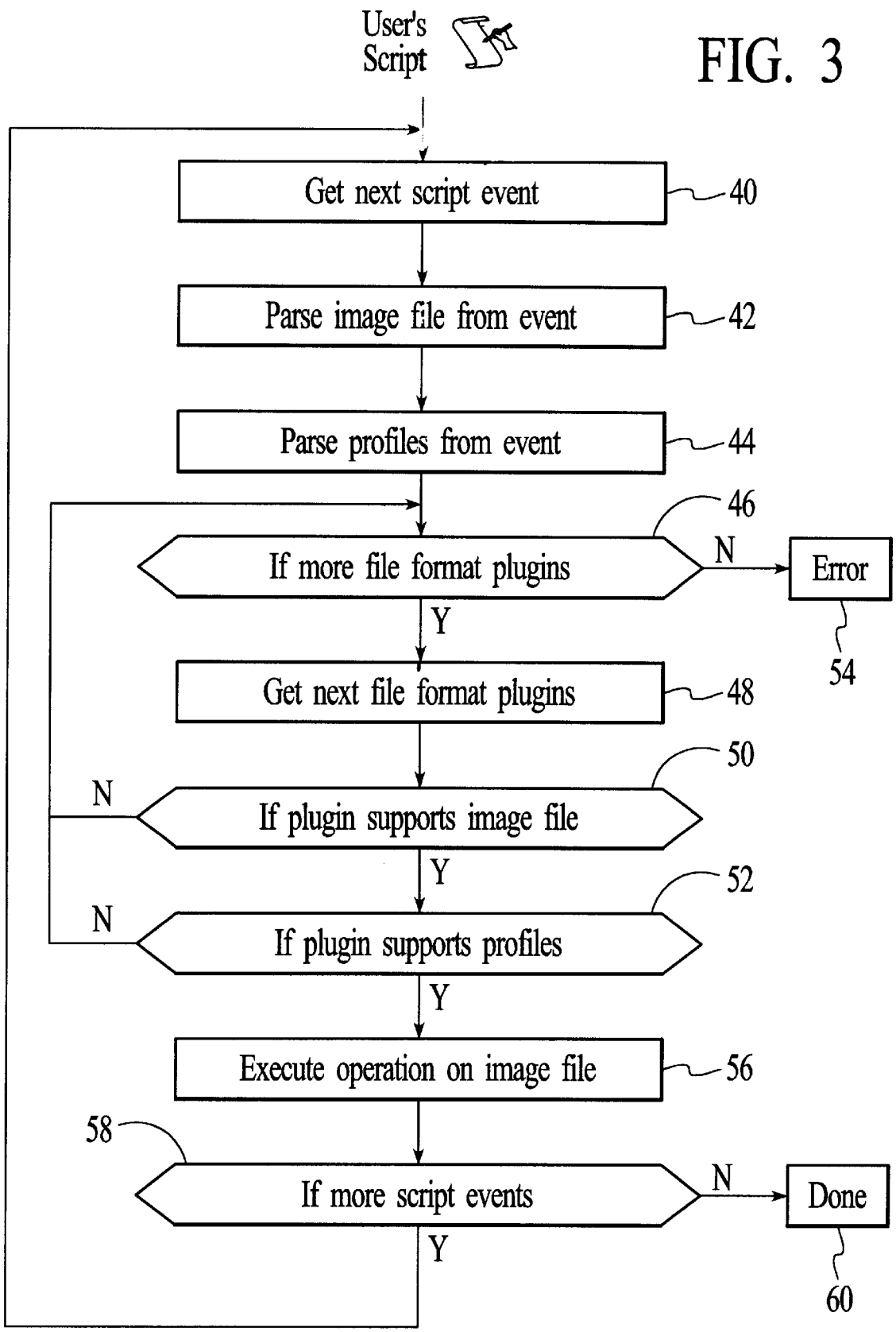
FIG. 3 illustrates a flow diagram of processing of script events from a user's script by a color management API.

FIG. 3 illustrates a flow diagram of processing of script events from a user's script by the color management API. The process is suitably stored in a computer readable medium, e.g., memory 20 (FIG. 1), a floppy disk, etc., and initiates upon receipt of a user's script event (step 40), e.g., an instruction to perform color matching of images. The image file associated with an image is then suitably parsed from the scripted event (step 42). Profiles for the image are also suitably parsed from the scripted event (step 44). A determination of an appropriate file format follows. When, an untested file format plug-in exists, as determined via step 46, the file format plug-in is retrieved (step 48). If the file format plug-in does not support the image file, ;as determined via step 50, the process returns to identify whether another file format plug-in exists (step 46). When the plug-in does support the image file, a determination of whether the plug-in supports the parsed profiles is made (step 52). When the plug-in does not support the profiles, identification of the existence of another file format plug-in occurs (step 46). When the file format plug-ins have been exhausted without finding a compatible one (i.e., step 46 is negative), an error is returned (step 54).

Once a compatible file format has been identified, (i.e., steps 50 and 52 are affirmative), the color management API performs the scripted event on the image file (step 56). When there are more scripted events, as determined via step 58, the process returns to step 40 and repeats for the next scripted event. When all of the operations for the scripted events are successful, the process is completed (step 60).

Thus, with the preferred embodiment, desired functionalities of a color management API are accessible to end-users directly through scripting. Script support in the color management API suitably occurs as a background operation requiring no user interface and allows straightforward incorporation into a workflow for the scripting language. Users therefore are no longer forced to spend time launching an application program to gain access to color management API functionality. Further, users are also not restricted by an application program's ability to utilize the color management API.

As mentioned previously, other APIs may suitably employ the principles described herein to allow end-user access to the desired functionality of the API directly through scripting. By way of example, a user may establish a script to translate a text file of a first language into another language. A text management API may then suitably identify an appropriate language translation plug-in for the text file and perform the necessary translation operation and conversion to the appropriate format for return to the user in a manner suitable for text operations and in keeping with the processes described herein. Thus, although a user might use a word processing program that would not perform such operations and would not have access to the text management API, through script access to the API, preferred operations would still be capable of being performed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for utilizing functionality of an application program interface (API) of a computer system through script access to the API, the computer system including an operating system, the API beings within the operating system, the method comprising:

(a) receiving a script of one or more desired events for manipulating a file, the file having a format;

(b) identifying whether a compatible format for the file is known by the API via a script interface which is within the API; and (c) executing the script on the file by the API when a compatible format is known, wherein an application program is not required to access the API.

2. The method of claim 1 wherein the step of identifying (b) further comprises (b1) determining whether a format plug-in exists for the predetermined format.

3. The method of claim 1 wherein the API comprises a color management API.

4. The method of claim 3 wherein the file comprises an image file.

5. The method of claim 1 wherein when a compatible file format is not known, an error is returned.

6. A method for achieving end-user access to application programming interface (API) functionality of a computer system, the computer system including an operating system, the API being within the operating system, the method comprising:

forming a script of operations for execution on at least one file; and achieving the script of operations with a system API via a script interface which is within the API when the at least one file is compatible with the system API, wherein access to the system API functionality occurs transparently to the end-user, and wherein an application program is not required to access to the API.

7. The method of claim 6 wherein the system API comprises a color management API.

8. The method of claim 7 wherein the at least one file comprises an image file.

9. The method of claim 8 wherein the script of operations further comprises a color matching operation for the image file.

10. A computer system providing end-user access to application programming interface (API) functionality, the computer system comprising:
   a processor, the processor operating with an operating system, the operating system including at least one system API; and
   memory coupled to the processor, the memory storing at least one file and a script of operations for execution on the at least one file, wherein the processor achieves the script of operations with the at least one system API via a script interface which is within the API when the at least one file is compatible with the at least one system API, wherein access to the system API functionality occurs transparently to the end-user, and wherein an application program is not required to access to the API.

11. The system of claim 10 wherein the system API comprises a color management API.

12. The system of claim 11 wherein the at least one file comprises an image file.

13. The method of claim 12 wherein the script of operations further comprises a color matching operation for the image file.

* * * * *